No. 876,872. PATENTED JAN. 14, 1908.
G. B. HART.
DETACHABLE BAIL FOR FLOWER POTS.
APPLICATION FILED MAR. 1, 1907.
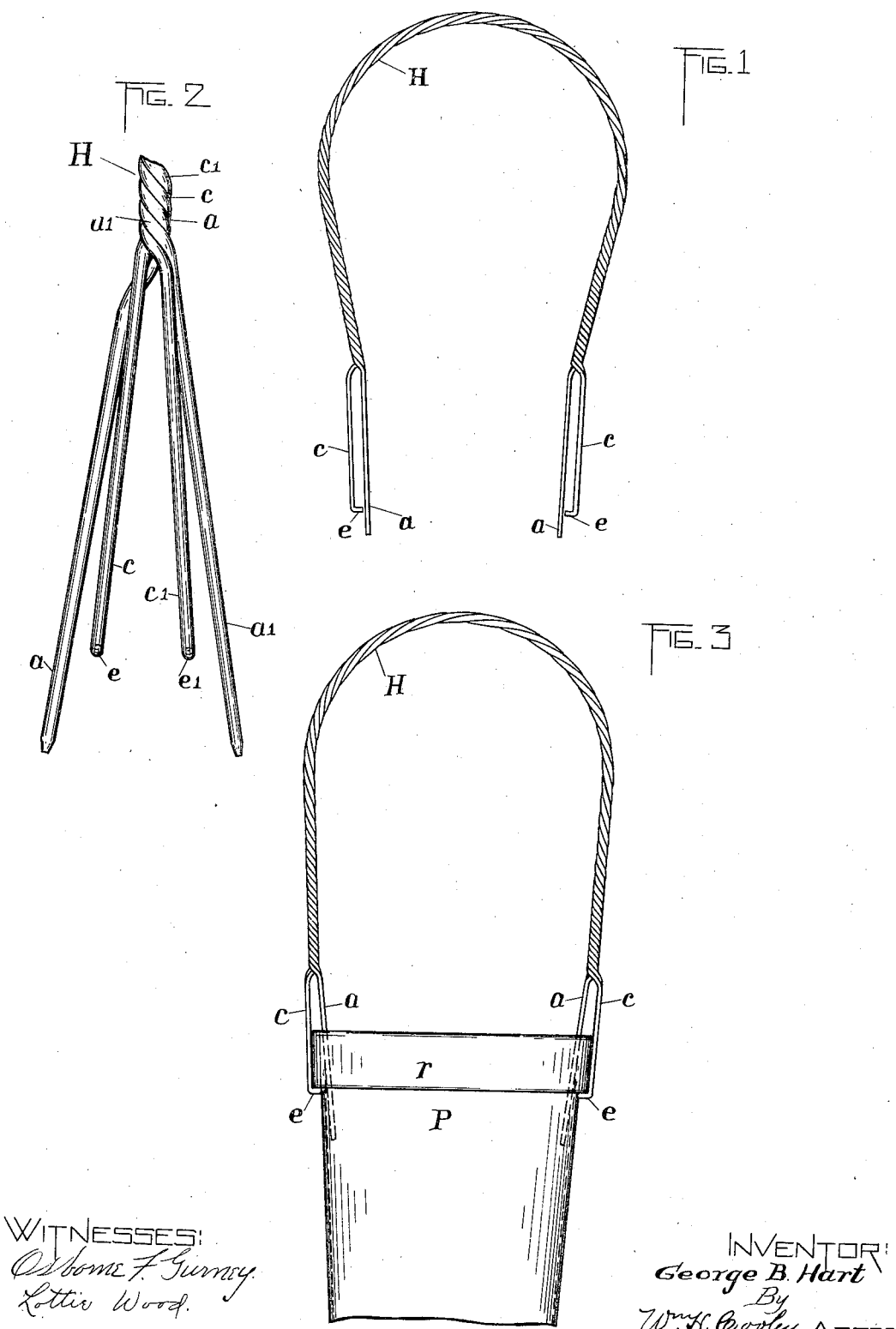
WITNESSES:
INVENTOR:
George B. Hart
By Wm. H. Cooley ATTY.

UNITED STATES PATENT OFFICE.

GEORGE B. HART, OF ROCHESTER, NEW YORK.

DETACHABLE BAIL FOR FLOWER-POTS.

No. 876,872.     Specification of Letters Patent.     Patented Jan. 14, 1908.

Application filed March 1, 1907. Serial No. 360,114.

*To all whom it may concern:*

Be it known that I, GEORGE B. HART, a citizen of the United States, and a resident of Rochester, in the county of Monroe and State of New York, have invented a new and Improved Detachable Bail for Flower-Pots and Like Articles, of which the following is a specification.

The object of my invention is to provide an economical and efficient bail for flower pots and like articles and one which may be readily attached thereto or detached therefrom.

My invention comprises at least two wires twisted together to form the main body portion of the bail and with the free end of a wire at each end of the bail adapted to engage within and another free end of a wire at each end adapted to engage outside of the flower pot or body to be carried by such bail. While my bail may be made from two of such wires, still, I prefer that such bail be made from at least three and preferably four of such wires so as to provide at least two of such members adapted to engage the side wall of the flower pot or like receptacle on one side and coöperating therewith one, and preferably two, also on the other side of the side wall of the flower pot.

Around flower pots and like articles such as are designed to be supported and carried by my bail and near the top thereof there is usually provided a rim consisting in a thickening of the side wall and with the projection formed by such thickened portion extending outwardly from the outside of the main portion of the wall, and for engaging under such rim the free ends of the wires at each end of the bail which are arranged to engage over the outside of the vessel are provided with hooks. The wires comprising my bail are so twisted together that there is a tendency between the coöperating and opposing members at each end thereof to spring together so as to firmly engage the outside and inside of the side wall of the flower pot or vessel in order to securely hold the same.

The accompanying drawings illustrating a bail in accordance with my invention are as follows:—

Figure 1 is a side view of the bail. Fig. 2 is an edge view of the lower right hand end of the bail H as seen from the right or from the outside. Fig. 3 shows a bail made in accordance with my invention in side view and attached to a flower pot or like article.

Similar letters refer to similar parts in the different views.

Referring to the drawings,—my bail comprises at least two wires and preferably three or four, four being shown in the drawings, firmly twisted together, as indicated, to form the main body portion H of the bail. Two of the free ends as $c$ and $c^1$ at each end of the bail have hooks as $e$ and $e^1$ respectively formed thereon adapted to engage under the usual rim $r$ around the top and on the outside of the flower pot, while the free ends $a$ and $a^1$ at each end of the bail are adapted to extend downwards against the inner surface of the side wall of the pot. The normal tendency of the members $a$ and $a^1$ is to spring outwardly while that of the members $c$ and $c^1$ is to spring inwardly.

In attaching the bail, the members $a$ and $a^1$, at each end of the handle or bail are brought against the inside of the flower pot or like article and the members $c$ and $c^1$ are sprung outwardly and each end of the handle is forced down so that the hooks $e$ engage on the outside of the flower pot and then the handle may be forced down until the parts assume the final and operative positions indicated in Fig. 3.

I desire to call attention to the fact that the members $a$ enter the twisted portion of the handle or bail on the outside thereof, while the members $c$ enter the twisted portion of the handle or bail on the inside thereof. The result of this is that a greater elasticity and a more effective springing action is brought about between the members $a$ and $a^1$ and $c$ and $c^1$.

What I claim is:—

1. A detachable bail for flower pots and like articles comprising a plurality of wires twisted together, the free ends of one or more of such wires at each end of such bail adapted to extend downwardly on the inside of the side wall of the vessel and the free ends of one or more of the remaining wires at each end of the bail hooked and adapted to extend downwardly on the outside of and engage under a rim or projection on the outside of the wall of such vessel.

2. A detachable bail for flower pots and like articles comprising a plurality of wires twisted together, the free ends of one or more of such wires at each end of such bail adapted to extend downwardly on the inside of the side wall of the vessel and the free ends of one or more of the remaining wires at each end of the bail hooked and adapted to extend downwardly on the outside of and engage under a rim or projection on the outside of the wall of such vessel, the free end or ends of the wires at each end of the bail arranged to engage on the side of the wall of the vessel opposite that side of the bail where they enter the twisted portion thereof.

3. A detachable bail for flower pots and like articles comprising a plurality of wires secured together at points removed from their free ends to secure a springing action thereof, the free ends of one or more of such wires at each end of such bail adapted to extend downwardly on the inside of the wall of the vessel and the free ends of one or more of the remaining wires at each end of the bail hooked and adapted to extend downwardly on the outside of and engage under a rim or projection on the outside of the wall of such vessel.

4. A detachable bail for flower pots and like articles comprising a plurality of wires secured together at points removed from their free ends to secure a springing action thereof, the free ends of one or more of such wires at each end of such bail adapted to extend downwardly on the inside of the side wall of the vessel and the free ends of one or more of the remaining wires at each end of the bail hooked and adapted to extend downwardly on the outside of and engage under a rim or projection on the outside of the wall of such vessel, the free end or ends of the wires at each end of the bail arranged to engage on the side wall of the vessel opposite that side of the bail where they are secured together.

GEORGE B. HART.

Witnesses:
LOTTIE WOOD,
OSBORNE F. GURNEY.